A. SAUNDERS,

Assignor to D. SAUNDERS' SONS.

PIPE CUTTER.

No. 10,021. Reissued Jan. 31, 1882.

Witnesses.
H. H. Parker
Robert W. Matthews

Inventor.
Andrew Saunders
By James A. Whitney
His Attorney

UNITED STATES PATENT OFFICE.

ANDREW SAUNDERS, OF YONKERS, NEW YORK, ASSIGNOR TO D. SAUNDERS' SONS, OF SAME PLACE.

PIPE-CUTTER.

SPECIFICATION forming part of Reissued Letters Patent No. 10,021, dated January 31, 1882.

Original No. 234,689, dated November 23, 1880. Application for reissue filed January 10, 1881.

*To all whom it may concern:*

Be it known that I, ANDREW SAUNDERS, of Yonkers, in the county of Westchester and State of New York, have invented certain Improvements in Pipe-Cutters, of which the following is a specification.

This invention comprises a novel combination of an adjustable rotary cutter with the stock of a pipe-cutting device so constructed that the said stock provides a bearing or support opposite the rotary cutter and a screw for forcing the rotary cutter toward the bearing, and so constructed and arranged as to serve both as a handle by which to turn the implement and as a screw for forcing the movable cutter-carrying arm toward the bearing opposite thereto, whereby is provided a simple, strong, and easily-manipulated implement for cutting pipes and similar articles.

The invention further comprises a novel combination of an adjustable rotary cutter with the stock of a pipe-cutting device, and with two bearing or anti-friction rollers so placed in said stock as to support and steady the pipe without material friction during the operation of the rotary cutter in severing the same, and a screw for forcing the cutter against the material to be cut.

The invention further comprises the combination, in a pipe-cutting implement, of the following elements, to wit: a stock for supporting the movable and moving parts of the apparatus, a screw for feeding the rotary cutter to its work, a pivoted arm carrying the rotary cutter in its outer end and placed to receive the impact of the end of the feeding-screw aforesaid, two anti-friction rollers placed in the outer jaw or angle of the stock, and the rotary cutter in the pivoted arm aforesaid, the whole constructed and arranged for joint operation in such a manner as to provide a simple, effective, and easily-operative implement for the purpose hereinbefore set forth.

Figure 1:
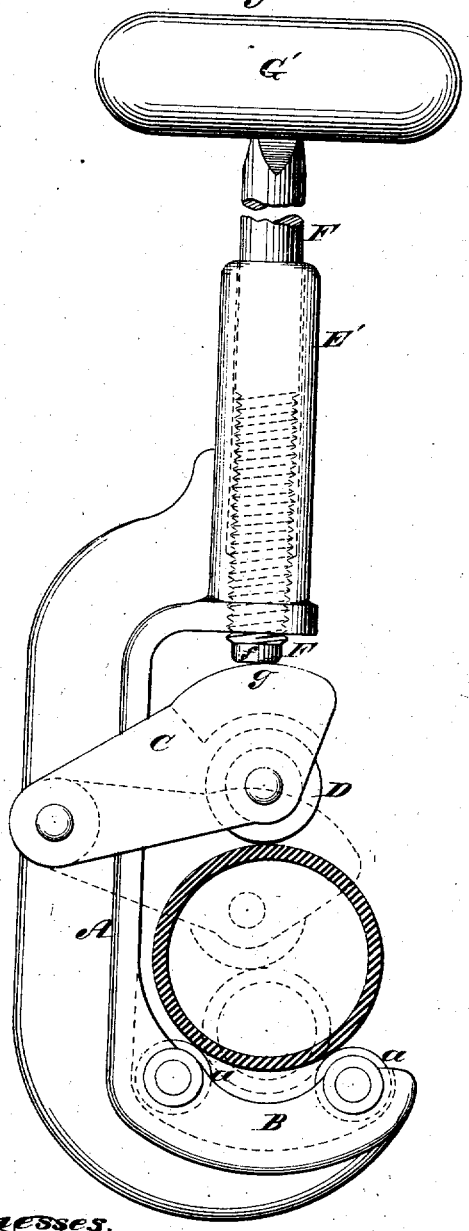
Figure 2:
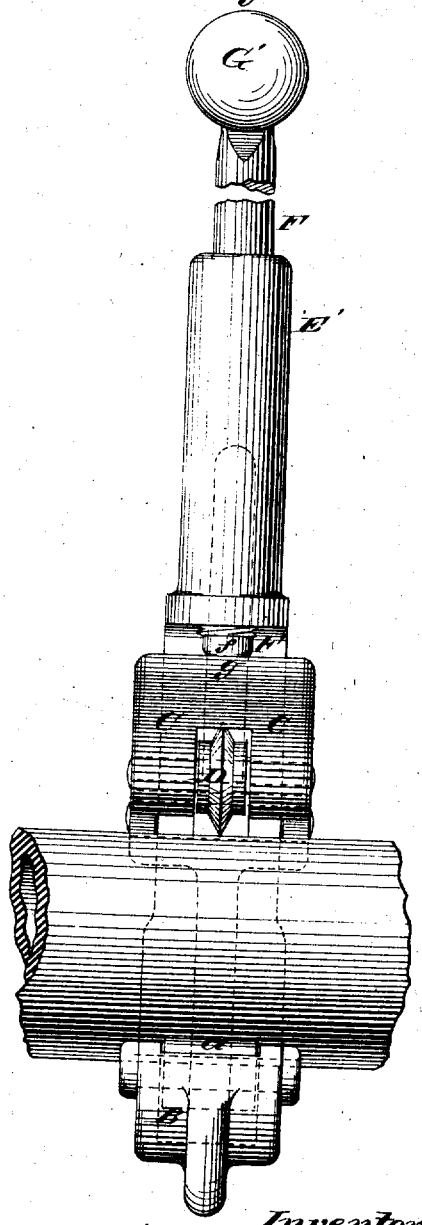

Figure 1 is a side view of an implement embracing my said invention; and Fig. 2 is an edge view—that is to say, a view taken in a plane at right angles to Fig. 1—of the said implement.

A is the stock, at the outer end of which is a single jaw or bend, B, in which are placed two anti-friction rollers, *a*.

C is a hinged arm, pivoted at one end, as shown at *b*, to the back of the stock A, and having at its opposite end the rotary cutter D, the axis or journal of which is shown at *c*.

The shank E′ is an internal screw thread or nut, which receives the feeding-screw F, which latter may have a cross-handle, G′, at the outer end. The inner end, *f*, of the screw F bears against the back *g* of the pivoted arm C, so by turning the screw F in one direction or the other, as the case may be, the arm C may be swung inward or outward, as may be required, to feed or move the rotary cutter D toward the anti-friction rollers *a*, or, as the case may be, to permit the said cutter to recede from said rollers.

In the operation of the invention the pipe to be cut is placed, as represented in the drawings, resting at one side against the anti-friction rollers *a*, and with the cutter D pressed against its opposite side by means of the screw F. The implement is then turned around the pipe D in the usual manner of a pipe-cutter, and as fast as the rotary cutter D cuts into the pipe it is fed inward by turning the screw F in the requisite direction, so that after a few revolutions of the implement around the pipe the latter is severed.

Inasmuch as the outer end of the pivoted arm C has a swing of considerable distance, it follows that the implement, constructed as just hereinbefore described, is capable of use upon pipes varying widely in diameter. Thus, for example, it may not only be used upon pipes of the diameter indicated in the drawings, but of those of much smaller diameter, as indicated in the dotted lines of Fig. 1.

The range of diameter of pipe capable of being cut by the implement will of course be varied in proportion to the size of the implement itself and to the length of the swing afforded to the pivoted arm C.

What I claim as my invention is—

1: In a pipe-cutting implement, the combination of the stock A, having the extended internally screw-threaded shank E′, and the bearing B, formed on the stock at a point opposite the axis of the said screw-threaded opening, with the movable rotary cutter, the cutter-carrying arm C, pivoted to the stock A, and the screw F, working through the shank E′, and constructed to serve both as a handle by which to turn the implement and as a screw for forcing the movable cutter-carrying arm toward the bearing B, all arranged substantially as and for the purpose set forth.

2. In a pipe-cutting implement, the combination of the anti-friction rollers *a* and an adjustable rotary cutter, D, with a stock, A, and a screw for forcing the cutter toward the material to be cut, substantially as and for the purpose herein set forth.

3. The combination, in a pipe-cutting implement, of the following elements, to wit: the stock A, the anti-friction rollers *a*, placed in the jaw B of the stock, the rotary cutter D, the arm C, pivoted to the said stock, and the feeding-screw F, all combined and arranged for joint use and operation, substantially as and for the purpose herein set forth.

ANDREW SAUNDERS.

Witnesses:
ALEX. SAUNDERS,
RALPH E. PRIME.